United States Patent

Bartels et al.

Patent Number: 5,967,281
Date of Patent: Oct. 19, 1999

[54] FRICTION CLUTCH

[75] Inventors: Ernst Bartels, Dittelbrunn; Bernhard Schierling, Kürnach, both of Germany

[73] Assignee: Mannesmann Sachs AG, Schweinfurt, Germany

[21] Appl. No.: 09/033,545

[22] Filed: Mar. 2, 1998

[30] Foreign Application Priority Data

Feb. 28, 1997 [DE] Germany .......................... 197 08 040

[51] Int. Cl.⁶ .......................... F16D 13/50; F16D 13/71
[52] U.S. Cl. ..................... 192/70.27; 192/89.23
[58] Field of Search .............. 192/70.27, 89.23, 192/89.25

[56] References Cited

U.S. PATENT DOCUMENTS

| | | | |
|---|---|---|---|
| 3,595,355 | 7/1971 | Maucher et al. | 192/70.27 |
| 3,939,951 | 2/1976 | Sink et al. | 192/89.23 |
| 5,645,153 | 7/1997 | Weidinger | 192/89.25 X |
| 5,687,825 | 11/1997 | Villata et al. | 192/89.23 |

FOREIGN PATENT DOCUMENTS

| | | |
|---|---|---|
| 1 475 332 | 4/1970 | Germany . |
| 2 261 775 | 6/1974 | Germany . |
| 1 344 232 | 1/1974 | United Kingdom . |
| 2 171 472 | 8/1986 | United Kingdom . |
| 2 318 159 | 4/1998 | United Kingdom . |

*Primary Examiner*—Richard M. Lorence
*Attorney, Agent, or Firm*—Cohen, Pontani, Lieberman & Pavane

[57] ABSTRACT

A friction clutch with a housing, a clutch disk having friction facings, and a diaphragm spring which presses a pressure plate against the clutch disk, contacts a knife edge formed at the pressure plate when the clutch is engaged, and lifts off from this knife edge to open the clutch. The housing and the diaphragm spring are connected so as to be fixed with respect to rotation relative to one another. The housing has a plurality of recesses which are arranged so as to be distributed along the circumference at the height of the knife edge. The diaphragm spring is provided on the radial outer side with a corresponding quantity of fingers, each of which engages in a recess when the clutch is open.

5 Claims, 2 Drawing Sheets

FRICTION CLUTCH

BACKGROUND OF THE INVENTION

1. Field of the Invention

The invention relates to a friction clutch with a housing, a clutch disk having friction facings, and a diaphragm spring which presses a pressure plate against the clutch disk, contacts a knife edge formed at the pressure plate when the clutch is engaged, and lifts off from the knife edge to release the clutch. The housing and the diaphragm spring are connected so as to be fixed with respect to rotation relative to one another.

2. Description of the Prior Art

A friction clutch of this kind is disclosed, for example, in German reference DE-PS 14 75 332. In order to transmit the torque generated in the drive train, for example, by an internal combustion engine, the clutch disk is pressed on the flywheel by the pressure plate. The contact pressing force is applied by a diaphragm spring which is supported at the clutch housing and which rests with its radial outer area on the knife edge which is provided around the circumference of the pressure plate. For the purpose of disengaging the clutch, the diaphragm spring is pressed in the axial direction so that it lifts off the pressure plate and its radial outer area swivels back in the direction of the clutch housing. Sufficient axial space must be provided so that the spring does not strike against the clutch housing. In the known clutch, this axial space is created by an axial curvature or bulge of the housing.

As a result of increasing optimization of vehicles and the increasing multiplicity of equipment, all structural component parts are required to be as compact and as light as possible. Due to the necessary axial space provided between the pressure plate and the housing, the clutch is correspondingly large in the axial direction. A reduction in the thickness of the pressure plate is usually ruled out because this pressure plate must have a sufficient thermal capacity to store the heat (friction energy) occurring when the clutch is engaged without warping. A reduction in the thickness of the housing is also possible only to a certain degree because, naturally, as the thickness decreases there is an increased risk that the housing will bend.

SUMMARY OF THE INVENTION

Accordingly, it is an object of the present invention to provide a friction clutch that has a reduced axial length relative of a conventional friction clutch.

Pursuant to this object, and others which will become apparent hereafter, one aspect of the present invention resides in a friction clutch having a housing with a plurality of recesses which are arranged so as to be circumferentially distributed at the height of the knife edge. The diaphragm spring is provided on the radial outer side with a corresponding quantity of fingers, each of which engages in a recess when the clutch is open.

As a result of the arrangement of the fingers, the diaphragm spring is also expanded radially outward. The fingers rest on the knife edge of the pressure plate and transmit the contact pressing force. Since they engage in the recesses in the housing in the disengaged state (clutch open), the necessary axial space is created in the housing itself. The extent of the space that is created in the axial direction depends upon the extension of the recess in the radial direction. The larger this extension, the more constructional space can be made available.

The quantity of fingers preferably corresponds to the number of tongues of the diaphragm spring which face radially inward. Accordingly, a direct frictional engagement is ensured by the annular region of the diaphragm spring.

When the pressure plate is constructed so as to decrease in the radial inward direction proceeding from the tongues, that is, when it extends diagonally in cross section, the constructional space is further optimized in that the knife edge need not project axially from the pressure plate, or if so only slightly, in order to permit a deflecting movement of the diaphragm spring without the spring striking the pressure plate.

In order to increase the thermal capacity of the pressure plate, in another embodiment of the invention, the pressure plate is provided with axially projecting shoulders which engage between the fingers of the diaphragm spring. The shoulders preferably project axially beyond the fingers. These fingers can extend right up to the housing. As is well known, the pressure plate carries out an axial movement when the clutch is released. Since there is no relative rotation between the housing and the pressure plate, the shoulders can be long enough so that they just abut at the housing when the clutch is opened. This arrangement either brings about an increase in the mass of the pressure plate so that the thermal capacity increases or, with thermal capacity remaining the same, makes the pressure plate thinner so that the axial constructional space is further reduced.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
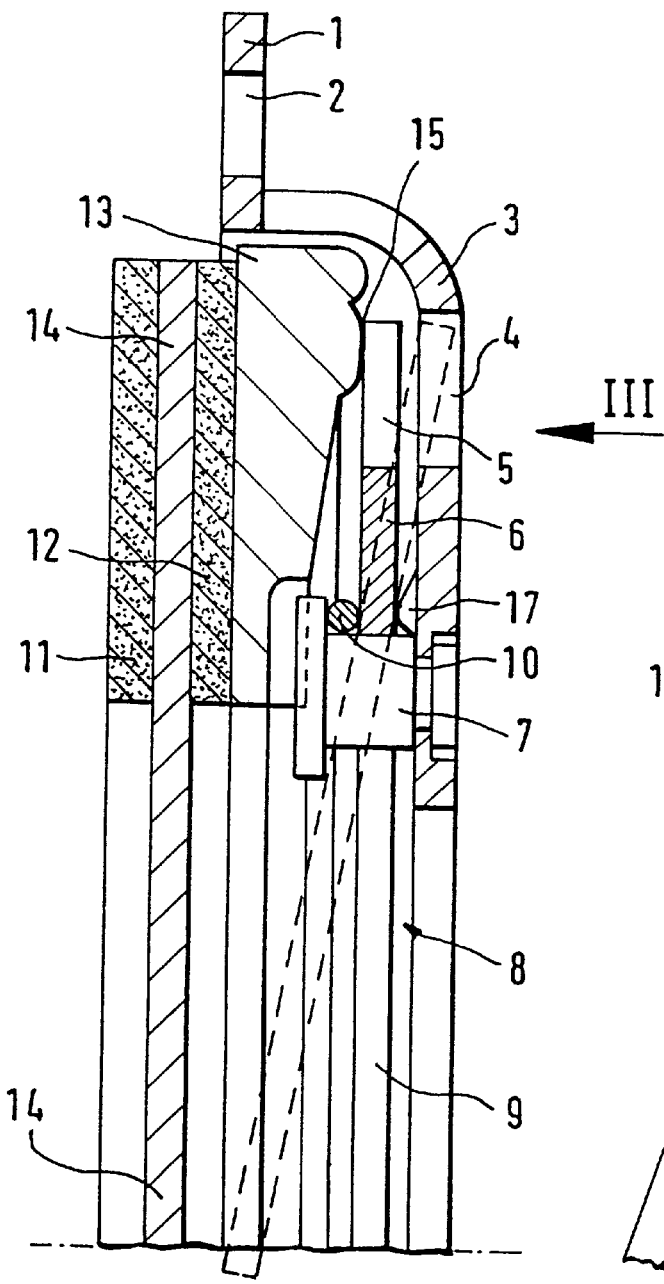
FIG. 1 is a simplified sectional view of the upper part of a friction clutch pursuant to the present invention.

The friction clutch comprises a housing 3 which can be connected with a flywheel, not shown, of an internal combustion engine via fastening bore holes 2 provided in a flange 1. A clutch disk 14 which is provided with friction facings 11, 12, a pressure plate 13 and a diaphragm spring 8 are arranged coaxial to one another in the housing 3. The diaphragm spring 8 is connected with the housing 3 so as to be fixed with respect to relative rotation via a plurality of spacer pins 7. In the engaged state of the clutch, the pressure plate 13 presses the clutch disk 14 with its friction facing 11 on the flywheel, not shown. The contact pressing force is applied via the diaphragm spring 8.

The diaphragm spring 8 has an annular region 6, fingers 5 which adjoin the annular region 6 radially outside and are spaced at regular intervals along the circumference, and tongues 9 which project inward radially and are likewise circumferentially spaced at regular intervals. The quantity and arrangement of the fingers 5 can correspond to that of the tongues 9. The housing 3 is provided with recesses 4 at the height of the circumferentially extending knife edge 15 which is contacted by the fingers 5 of the diaphragm spring 8 when the clutch is closed. When the clutch is opened, the fingers 5 engage in the recesses 4 in the clutch housing 3 as is indicated by a dashed line in FIG. 1. A wire ring 10 is inserted between the annular region 6 and the spacer pins 7 to serve as a bearing which is designated by 16 in the schematic drawing according to FIG. 2. A second bearing 17 is formed on the housing 3 so as to be opposite the bearing 16.

Figure 2:
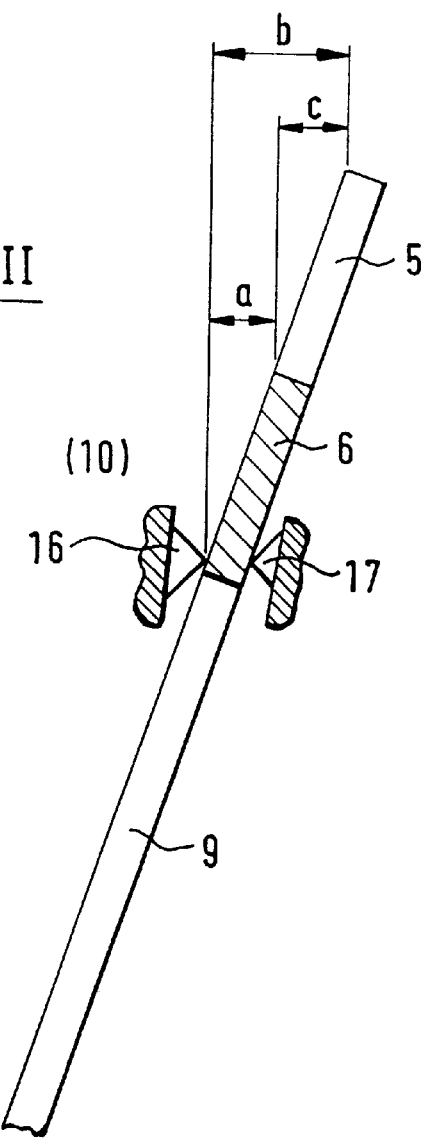
FIG. 2 is a schematic view of the diaphragm disk.
Figure 3:
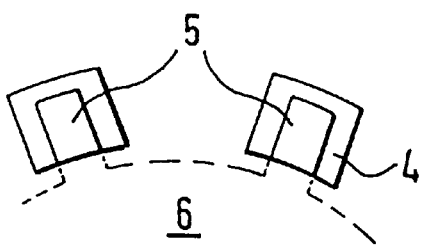
FIG. 3 is a simplified partial view along arrow III in FIG. 1.

The kinematic relationships during the releasing movement are clearly indicated in the schematic shown in FIG. 2. In a conventional friction clutch, the lift-off of the diaphragm spring 8 is designated by a distance "a" and must be present as a free path to the housing 3. The diaphragm spring 8, however, can execute a lift-off "b", since a distance "c" is shifted into the housing through the engagement of the fingers 5 in the recesses 4. The axial constructional space c that is gained is consequently calculated according to the formula c=b−a. The previous disengagement path/lift-off equation is changed as a result of these kinematic relationships. Either the disengagement path is decreased or the transmission or reduction ratios are changed so that the pitch diameter of the diaphragm spring 8 is increased and the plate cross section is accordingly moved radially outward so that the thickness of the diaphragm spring 8 can be reduced at a constant contact pressing force.

Figure 4:
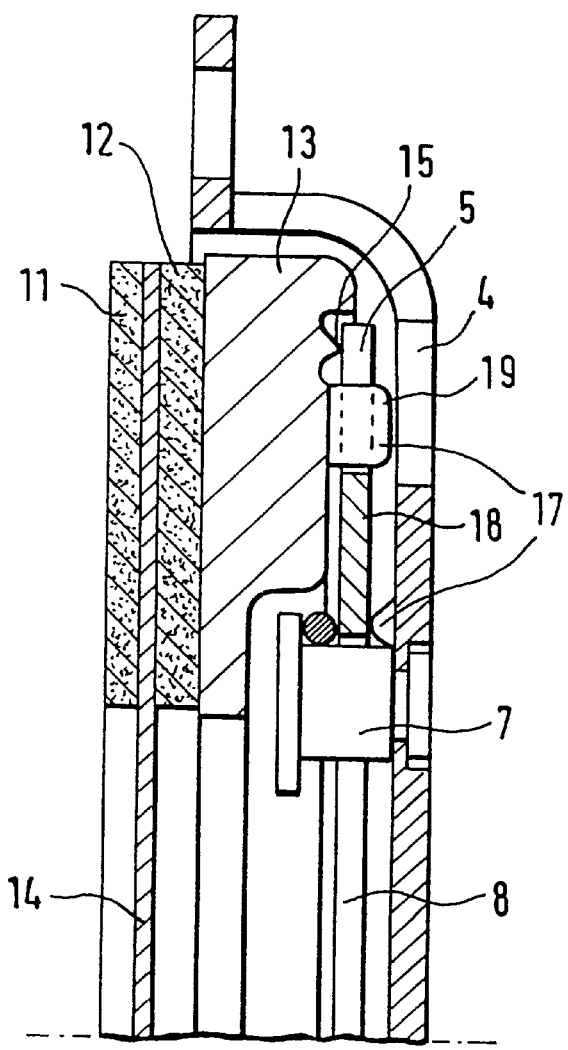
FIG. 4 is a simplified sectional view of the upper part of a friction clutch in a second embodiment.

Additional constructional space is made available in the embodiment shown in FIG. 4. Axially projecting shoulders 19 are distributed at regular intervals along the circumference of the pressure plate 13 and engage between two fingers 5 and project axially over the fingers 5. The mass which is accordingly obtained and which is necessary for thermal storage in order to prevent warping of the pressure plate 13 can be used to reduce the thickness of the pressure plate 13. As is indicated with 18, the pressure plate 13 proceeds from the knife edge 15 in such a way that it becomes thinner in the radial inward direction. In this respect, the angle (shown in cross section) is selected in such a way that it corresponds to the maximum diagonal position of the diaphragm spring 8 so that the diaphragm spring 8 runs parallel to the pressure plate 13 in the disengaged state of the clutch. The knife edge 15 can accordingly be integrated further into the pressure plate 13, and the pressure plate 13 projects away axially over the fingers 5 of the diaphragm spring 8 radially outward so as to increase mass.

The invention is not limited by the embodiments described above which are presented as examples only but can be modified in various ways within the scope of protection defined by the appended patent claims.

We claim:

1. A friction clutch, comprising:

a housing;

a clutch disk arranged in the housing and having friction facings;

a pressure plate having a knife edge and being movably arranged in the housing so as to be pressable against the clutch disk; and a diaphragm spring movably arranged in the housing so as to contact the knife edge when the clutch is engaged, and lift off from the knife edge to open the clutch, the housing and the diaphragm spring being connected together so as to be fixed with respect to rotation relative to one another, the housing having a plurality of circumferentially distributed recesses at a height of the knife edge, the diaphragm spring having a plurality of radially outwardly directed fingers corresponding to the plurality of recesses so that a respective finger engages in a respective recess when the clutch is open.

2. A friction clutch according to claim 1, wherein the diaphragm spring has a plurality of radially inwardly directed tongues corresponding in number to the fingers.

3. A friction clutch according to claim 1, wherein the pressure plate is configured to have a thickness that decreases radially inwardly from the knife edge.

4. A friction clutch according to claim 1, wherein the pressure plate has axially projecting shoulders arranged to engage between the fingers of the diaphragm spring.

5. A friction clutch according to claim 4, wherein the shoulders are configured to project axially beyond the fingers.

\* \* \* \* \*